June 19, 1962 R. C. BERRY 3,040,120
CABLE CLAMPING ASSEMBLY
Filed Nov. 16, 1959
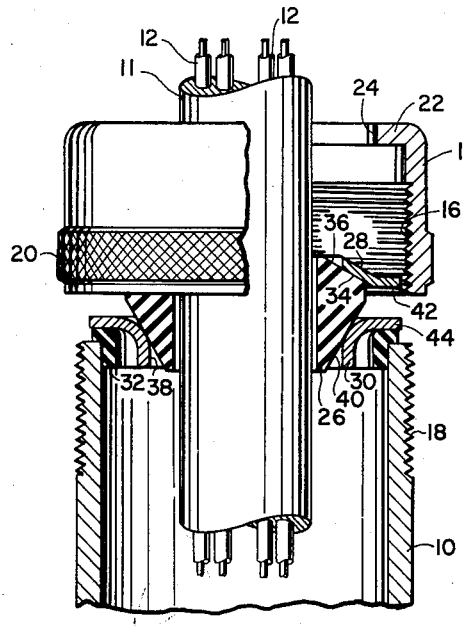
FIG__1__
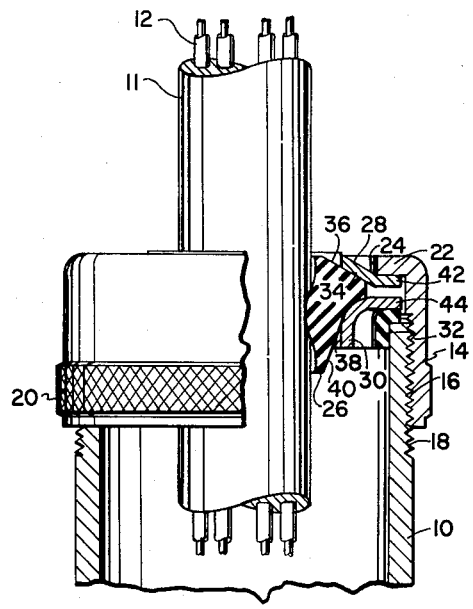
FIG__2__
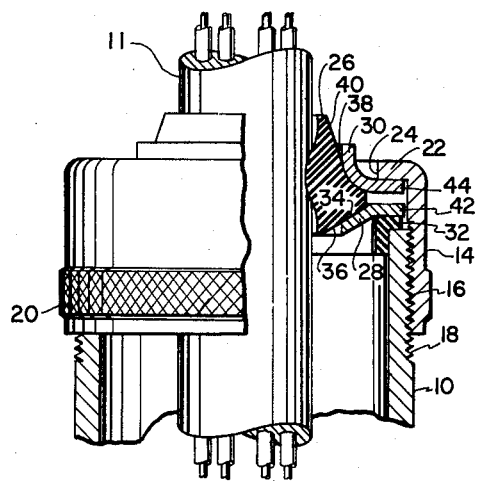
FIG__3__
INVENTOR.
Richard C. Berry
BY
D. Emmett Thompson
ATTORNEY

3,040,120
CABLE CLAMPING ASSEMBLY
Richard C. Berry, Camillus, N.Y., assignor to Crouse-Hinds Company, Syracuse, N.Y., a corporation of New York
Filed Nov. 16, 1959, Ser. No. 853,107
2 Claims. (Cl. 174—77)

This invention relates to and has as an object a new and improved cable clamping assembly which functions to a clamp a cable, or the like, in an electrical connection in a mechanically secure and moisture-proof manner and wherein the assembly is simple to use and economical to manufacture.

The invention consists in the novel features and in the combinations and construction hereinafter set forth and claimed.

In describing this invention, reference is had to the accompanying drawings in which like characters designate corresponding parts in all the views.

In the drawings—

FIGURE 1 is a fragmentary cross-sectional view of a preferred embodiment of the assembly shown in the position just prior to clamping.

FIGURE 2 is a cross-sectional view showing the invention in the clamping position.

FIGURE 3 is a view similar to FIGURE 2 showing the assembly in alternative position.

In the embodiment illustrated, the cable clamping assembly is shown in connection with an open end tubular body 10 such as an electrical connector handle, or the like, and the cable clamping assembly functions to clamp the cable 11 which contains a plurality of electrical conductors 12 therein to the body 10 in a mechanically secure and moisture-proof fashion.

The cable clamping assembly comprises a clamp member 14 which may be provided with threads 16 for engagement with the threads formed on the outer end of the body 10. The clamp member 14 may be provided with a hexagonal surface 20 to facilitate the tightening of the clamp member 14 on the body 10. As will be obvious, any suitable means for attaching and tightening the member 14 on the body 10 may be utilized.

The outer end of the clamp member 14 is provided with a radially inwardly extending annular shoulder 22 which terminates a spaced distance inwardly from the outer surface of the member 14 to provide an aperture 24 for the passage of the cable 11 through the member 14.

A resilient deformable sleeve-like bushing, or grommet 26 is carried between the clamp member 14 and the tubular body 10 by a pair of sleeve supporting members 28 and 30. A gasket 32 is shown mounted between the innermost sleeve supporting member and the upper end of the tubular member 10 for a purpose to be hereinafter described.

The sleeve supporting member 28 is formed with a radially inwardly extending tapered bore 34 which is seated against the complementally formed upper surface 36 of the sleeve 26.

The sleeve supporting member 30 is formed with a radially inwardly extending curved bore 38 which seats against the tapered surface 40 formed on the sleeve 26. Each of the sleeve supporting members 28 and 30 are formed with radially outwardly extending flanges 42 and 44, respectively, which are received between the annular shoulder 22 formed on the clamp member 14 and the gasket 32 positioned on the open outer end of the tubular member 10.

After the cable carrying the conductors 12 has been inserted through the sleeve 26 as shown in FIGURE 1, the clamp member 14 is tightened on the tubular member 10 by the threaded connection. This tightening applies an axial pressure between the clamp member 14 and the tubular member 10 so as to engage the flanges 42 and 44 of the sleeve supporting members 28 and 30 to move the members axially together. This axial movement is translated by reason of the surfaces 34 and 38 on the sleeve supporting members 28 and 30 to the surfaces 36 and 40 on the sleeve 26 to deform the sleeve 26 both radially and axially, as is shown in FIGURES 2 and 3, to securely grip the cable 11 within the sleeve 26 and to seal the cable 11 in the sleeve 26 against the passage of moisture.

By reason of the novel construction of the cable clamping assembly, as just described, the sleeve 26 and sleeve supporting members 28 and 30 may be reversed into the position shown in FIGURE 3 in order to provide additional axial space within the body 10 for the attachment of the conductors 12 to the terminals of the electrical connector carried by the body 10, or for any other reason.

I claim:
1. A cable clamping assembly comprising a clamp member open at one end for attachment to an open end tubular body co-operable means on said clamp member and said tubular body for attaching said member to said body, said clamp member being provided at its opposite end with an aperture to permit the passage of a cable therethrough and a radially inwardly extending annular shoulder, a resilient sleeve member mounted between a pair of sleeve supporting members, said sleeve member having a cylindrical bore and a pair of external conical surfaces, one of said sleeve supporting members being formed with a radially inwardly extending tapered bore and a radial flange, the other of said sleeve supporting members being formed with a radially inwardly extending bore having a radius of curvature and a radial flange, the radial flanges of said sleeve supporting members being received between said open end tubular member and said annular shoulder on said clamp member whereby the conical surfaces of said sleeve member will be engaged by said sleeve supporting members and deformed radially and axially to grip said cable upon the attachment under axial pressure of said clamp member to said tubular body.

2. The cable clamping assembly of claim 1, wherein said sleeve and said sleeve supporting members are reversible and a gasket member is positioned between said open end tubular member and one of said sleeve supporting members.

References Cited in the file of this patent
UNITED STATES PATENTS

| | | |
|---|---|---|
| 2,243,356 | Olson | May 27, 1941 |
| 2,536,802 | Fehr et al. | Jan. 2, 1951 |
| 2,639,313 | Street | May 19, 1953 |
| 2,768,231 | Schwennesen et al. | Oct. 23, 1956 |

FOREIGN PATENTS

| | | |
|---|---|---|
| 839,587 | France | Jan. 14, 1939 |
| 840,649 | France | Jan. 23, 1939 |